United States Patent
Lai et al.

(10) Patent No.: US 10,707,601 B1
(45) Date of Patent: Jul. 7, 2020

(54) MEMORY SOCKET PROTECTING COVER AND MEMORY SOCKET ASSEMBLY

(71) Applicant: GIGA-BYTE TECHNOLOGY CO.,LTD., New Taipei (TW)

(72) Inventors: Chih-Ming Lai, New Taipei (TW); Yung-Shun Kao, New Taipei (TW); Chung-Wei Chiang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/445,247

(22) Filed: Jun. 19, 2019

(30) Foreign Application Priority Data

Apr. 10, 2019 (TW) .............................. 108112424 A (51) Int. Cl.
*H01R 12/70* (2011.01)
*H01R 12/72* (2011.01)
*H01R 12/73* (2011.01)
*H01R 13/516* (2006.01)

(52) U.S. Cl.
CPC ....... *H01R 12/7005* (2013.01); *H01R 12/721* (2013.01); *H01R 12/737* (2013.01); *H01R 13/516* (2013.01)

(58) Field of Classification Search
CPC .............. H01R 12/737; H01R 12/721; H01R 12/7005; H01R 13/516
See application file for complete search history.

(56) References Cited

U.S. PATENT DOCUMENTS

| 5,943,218 | A | * | 8/1999 | Liu | ...................... | H05K 7/1405 |
| | | | | | | 361/679.32 |
| 6,056,579 | A | * | 5/2000 | Richards, III | ....... | H05K 7/1454 |
| | | | | | | 439/327 |
| 7,145,779 | B2 | * | 12/2006 | Lien | ...................... | H05K 1/142 |
| | | | | | | 361/729 |
| 7,775,811 | B2 | * | 8/2010 | Lai | ...................... | H01R 13/443 |
| | | | | | | 439/135 |

(Continued)

FOREIGN PATENT DOCUMENTS

CN 205429312 8/2016

OTHER PUBLICATIONS

"Search Report of Europe Counterpart Application", dated Feb. 19, 2020, p. 1-p. 9.

*Primary Examiner* — Briggitte R. Hammond
(74) *Attorney, Agent, or Firm* — JCIPRNET (57) ABSTRACT

A memory socket protecting cover adapted to be assembled to a memory socket which is adapted for a memory module to insert is provided. The memory module includes a fool-proof concave, and includes a fool-proof member corresponding to the fool-proof concave. The memory socket protecting cover includes two lateral walls and a wear-resistant member. The two lateral walls are adapted to be disposed at two sides of the memory socket. The wear-resistant member is connected to the two lateral walls and adapted to be disposed on the fool-proof member. A width of the wear-resistant member is greater than or equal to a width of the fool-proof member and is smaller than a width of the fool-proof concave. When the memory module is inserted in or pulled from the memory socket, a wall of the memory module besides the fool-proof concave is adapted to contact the wear-resistant member.

11 Claims, 9 Drawing Sheets

(56) References Cited

U.S. PATENT DOCUMENTS

| | | | | |
|---|---|---|---|---|
| 8,403,689 B2* | 3/2013 | Li | ................. | H01R 12/721 |
| | | | | 439/160 |
| 8,553,423 B2* | 10/2013 | Sun | ................. | G06F 1/185 |
| | | | | 361/759 |
| 9,711,890 B1* | 7/2017 | Lai | ................. | H01R 13/516 |
| 9,837,751 B2* | 12/2017 | Lai | ................. | H01R 12/737 |
| 2018/0090864 A1 | 3/2018 | Niu et al. | | |

* cited by examiner

MEMORY SOCKET PROTECTING COVER AND MEMORY SOCKET ASSEMBLY

ROSS-REFERENCE TO RELATED APPLICATION

This application claims the priority benefit of Taiwan application serial no. 108112424, filed on Apr. 10, 2019. The entirety of the above-mentioned patent application is hereby incorporated by reference herein and made a part of this specification.

BACKGROUND

Field of the Invention

The invention relates to a socket protecting cover and a socket assembly and more particularly, to a memory socket protecting cover and a memory socket assembly.

Description of Related Art

At present, a memory slot includes a fool-proof member disposed therein for preventing a user from inversely inserting a memory module. The fool-proof member is commonly a product manufactured by means of plastic injection. When the memory module, after being plugged and unplugged for many times, is worn, that may further influence alignment accuracy between goldfingers on the memory module and pads inside a memory slot, which may cause issues between the goldfingers on the memory module and the pads inside the memory slot, such as poor contact, offset misalignment or short circuit.

SUMMARY

The invention provides a memory socket protecting cover capable of reducing a probability that a fool-proof member of a memory socket is worn, such that goldfingers on a memory module is capable of being accurately inserted into a memory slot.

The invention provides a memory socket assembly having the aforementioned memory socket protecting cover.

A memory socket protecting cover of the invention is adapted to be assembled to a memory socket which is adapted for a memory module to insert is provided. The memory module includes a fool-proof concave, and the memory socket includes a fool-proof member corresponding to the fool-proof concave. The memory socket protecting cover includes two lateral walls and a wear-resistant member. The two lateral walls are adapted to be disposed at two sides of the memory socket. The wear-resistant member is connected to the two lateral walls and adapted to be disposed on the fool-proof member. A width of the wear-resistant member is greater than or equal to a width of the fool-proof member and is smaller than a width of the fool-proof concave. When the memory module is inserted in or pulled from the memory socket, a wall of the memory module besides the fool-proof concave is adapted to contact the wear-resistant member.

A memory socket assembly of the invention is adapted for a memory module to insert. The memory module includes a fool-proof concave, and the memory socket assembly includes a memory socket and a memory socket protecting cover. The memory socket includes a fool-proof member corresponding to the fool-proof concave. The memory socket protecting cover is assembled to the memory socket. The memory socket protecting cover includes two lateral walls and a wear-resistant member. The two lateral walls are disposed at two sides of the memory socket. The wear-resistant member is connected to the two lateral walls and disposed on the fool-proof member. A width of the wear-resistant member is greater than or equal to a width of the fool-proof member and is smaller than a width of the fool-proof concave. When the memory module is inserted in or pulled from the memory socket, a wall of the memory module besides the fool-proof concave is adapted to contact the wear-resistant member.

In an embodiment of the invention, the wear-resistant member includes a first portion, a second portion and a third portion which are sequentially connected together, the second portion is connected to the two lateral walls and adapted to be located on a top surface of the fool-proof member, and the first portion and the third portion are adapted to be respectively located at two sides of the fool-proof member.

In an embodiment of the invention, the first portion, the second portion and the third portion present a U-shaped column.

In an embodiment of the invention, the first portion, the second portion and the third portion present a J-shaped column.

In an embodiment of the invention, the wear-resistant member presents an I-shaped column, the wear-resistant member is adapted to be located on the top surface of the fool-proof member, and a thickness of the wear-resistant member is greater than a thickness of each of the lateral walls.

In an embodiment of the invention, the memory socket has a memory slot and two positioning grooves located at the two sides of the fool-proof member, an extension direction of the two positioning grooves is perpendicular to an extension direction of the memory slot, the two positioning grooves communicate with the memory slot, and the first portion and the third portion are inserted into the two positioning grooves to be positioned.

To sum up, the wear-resistant member of the memory socket protecting cover of the invention is adapted to be disposed on the fool-proof member of the memory socket, and the width of the wear-resistant member is greater than or equal to the width of the fool-proof member, such that when the memory module is inserted in or pulled from the memory socket, the wall of the memory module besides the fool-proof concave contacts the wear-resistant member, thereby reducing the probability that the fool-proof member of the memory socket is worn, as well as mitigating the issues between the goldfingers on the memory module and the pads inside the memory slot, such as poor contact, offset misalignment or short circuit.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
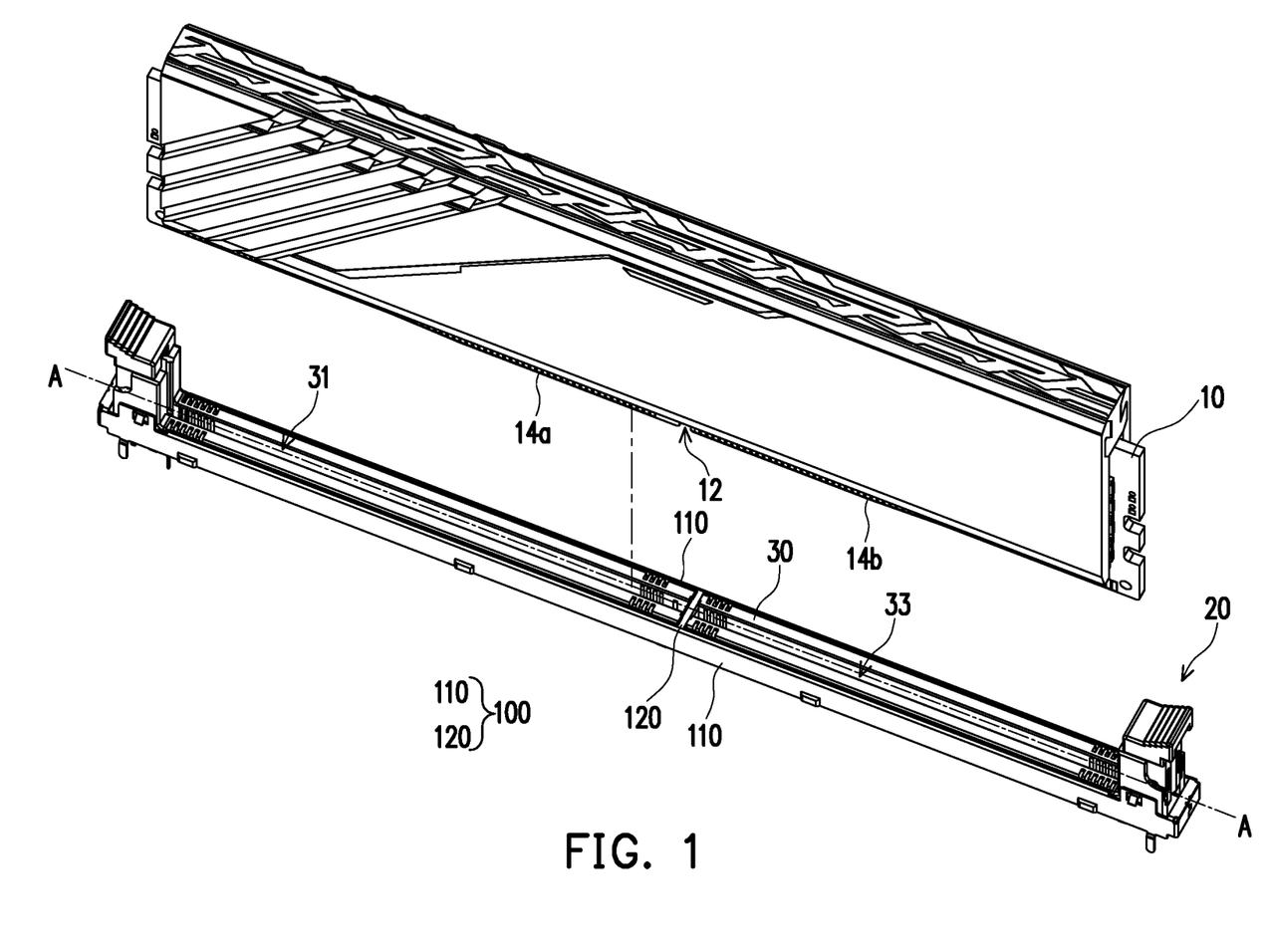
FIG. 1 is a schematic diagram illustrating a memory socket assembly which a memory module is not yet inserted into according to an embodiment of the invention.
Figure 2:
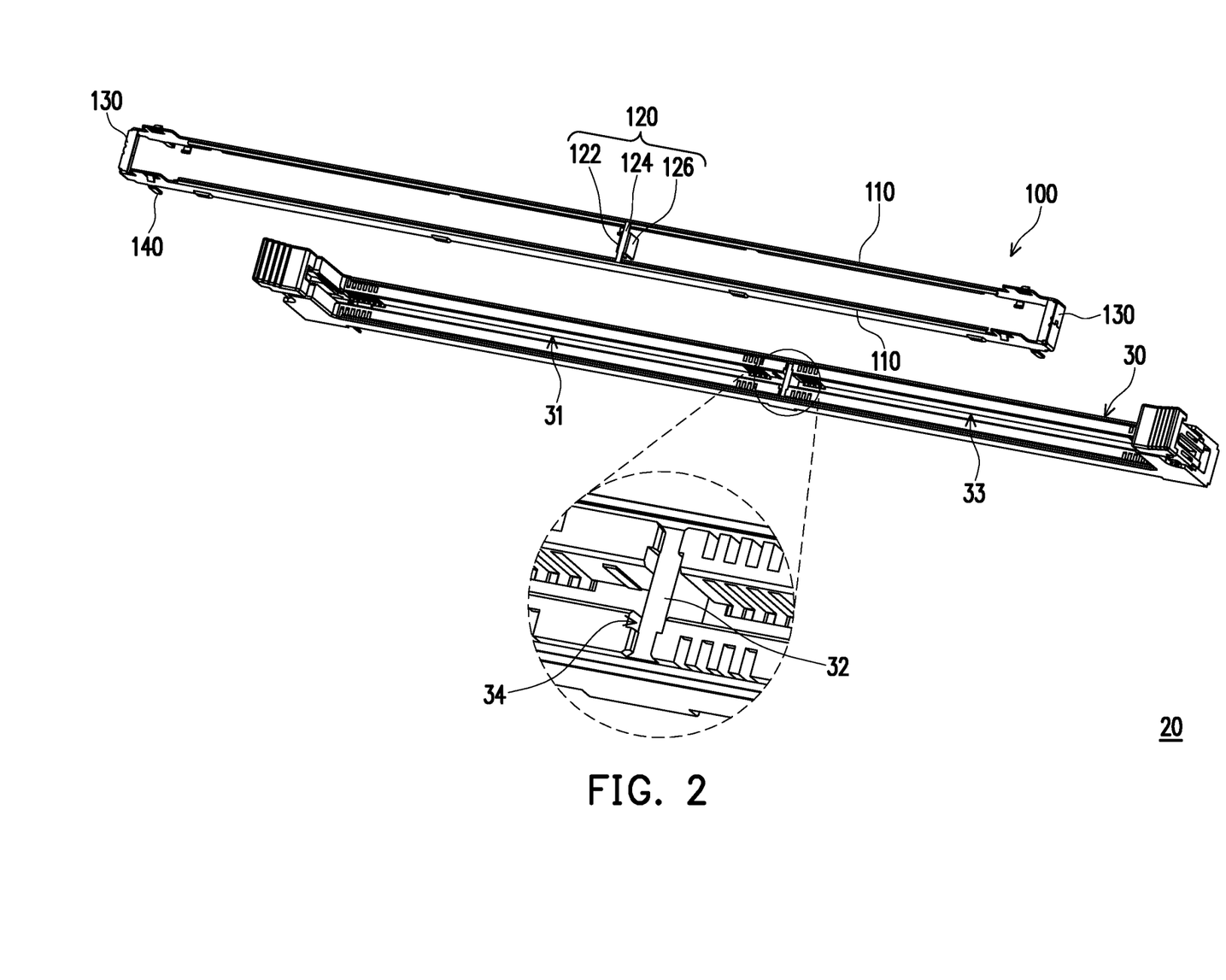
FIG. 2 is a schematic exploded diagram of the memory socket assembly depicted in FIG. 1.

FIG. 1 is a schematic diagram illustrating a memory socket assembly which a memory module is not yet inserted into according to an embodiment of the invention. FIG. 2 is a schematic exploded diagram of the memory socket assembly depicted in FIG. 1. Referring to FIG. 1 and FIG. 2, a memory socket assembly 20 of the present embodiment is adapted for a memory module 10 to insert. The memory module 10 is, for example, a DDR4 memory module 10, but the type of the memory module 10 is not limited thereto. The memory module 10 includes a fool-proof concave 12. The fool-proof concave 12 separates goldfinger terminals 14a and 14b of the memory module 10 into, for example, two sections having different lengths.

With reference to FIG. 2, in the present embodiment, the memory socket assembly 20 includes a memory socket 30 and a memory socket protecting cover 100. The memory socket 30 has memory slots 31 and 33 for the memory module 10 to insert, and the memory socket 30 includes a fool-proof member 32 corresponding to the fool-proof concave 12. The fool-proof member 30 separates the memory slots 31 and 33 into, for example, two sections having different lengths, so as to prevent a user from inversely inserting the goldfinger terminals 14a and 14b of the memory module 10 into the memory slots 31 and 33.

The memory socket protecting cover 100 is assembled to the memory socket 30 for improving structure strength of the memory socket 30. In the present embodiment, the memory socket protecting cover 100 includes two lateral walls 110 and a wear-resistant member 120. The two lateral walls 110 are disposed at two long side surfaces of the memory socket 30. In the present embodiment, the memory socket protecting cover 100 further includes two short walls 130 connected to the two lateral walls 110. The two short walls 130 correspond to two short side surfaces of the memory socket 30. In this way, the memory socket protecting cover 100 has a frame-shaped appearance, thereby providing preferable structure strength. Certainly, the type of the memory socket protecting cover 100 is not limited thereto.

In the present embodiment, a material of the memory socket protecting cover 100 is, for example, metal. For instance, the memory socket protecting cover 100 is made of, for example, iron, copper or stainless steel. Certainly, the material of the memory socket protecting cover 100 is not limited thereto, and any material capable of providing preferable structure strength is applicable thereto. In the present embodiment, since the memory socket protecting cover 100 is made of metal, it is capable of providing preferable heat dissipation, and the heat generated during the operation process of the memory module 10 may also be guided to the memory socket protecting cover 100 to enhance the heat dissipation effect.

Figure 3:
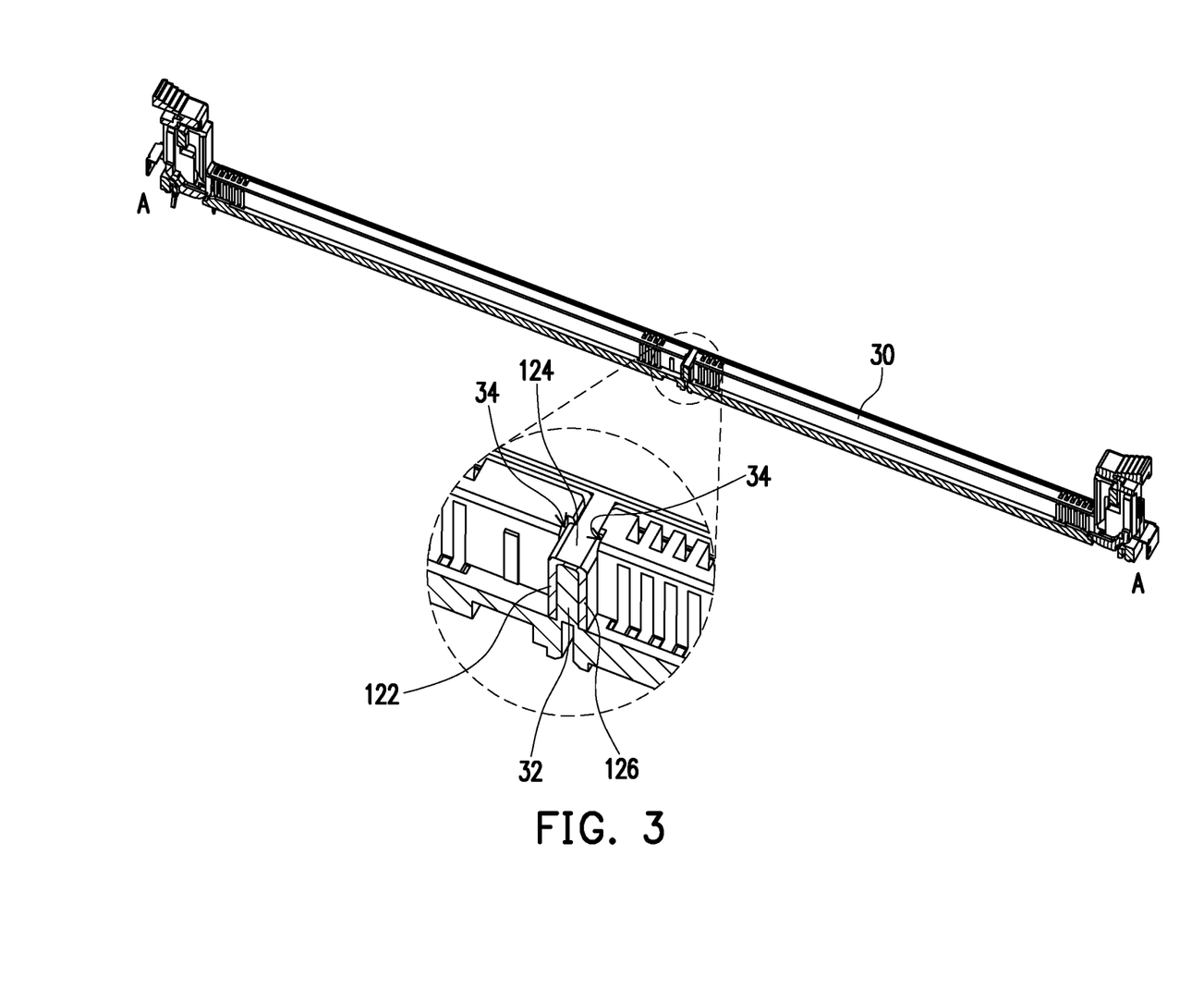
FIG. 3 is a schematic cross-sectional diagram of the memory socket assembly depicted in FIG. 1.
Figure 4A:
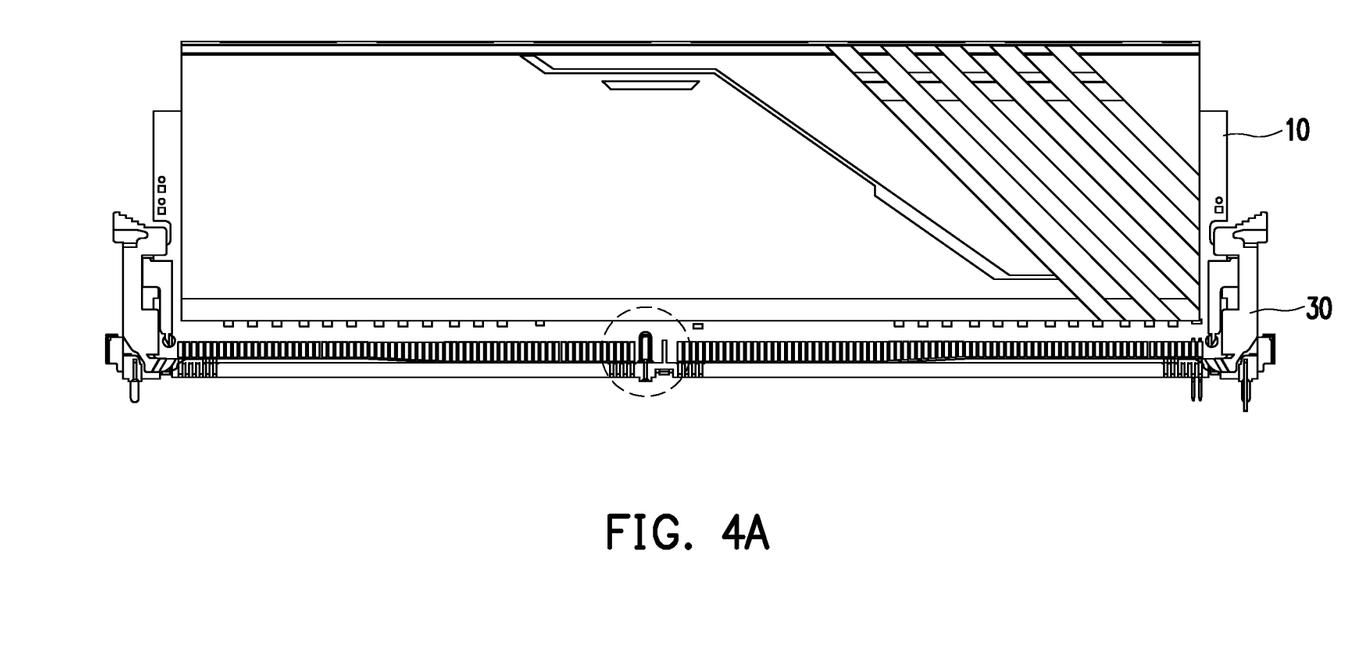
FIG. 4A is a schematic cross-sectional diagram of the memory module inserted in to the memory socket assembly depicted in FIG. 1.
Figure 4B:
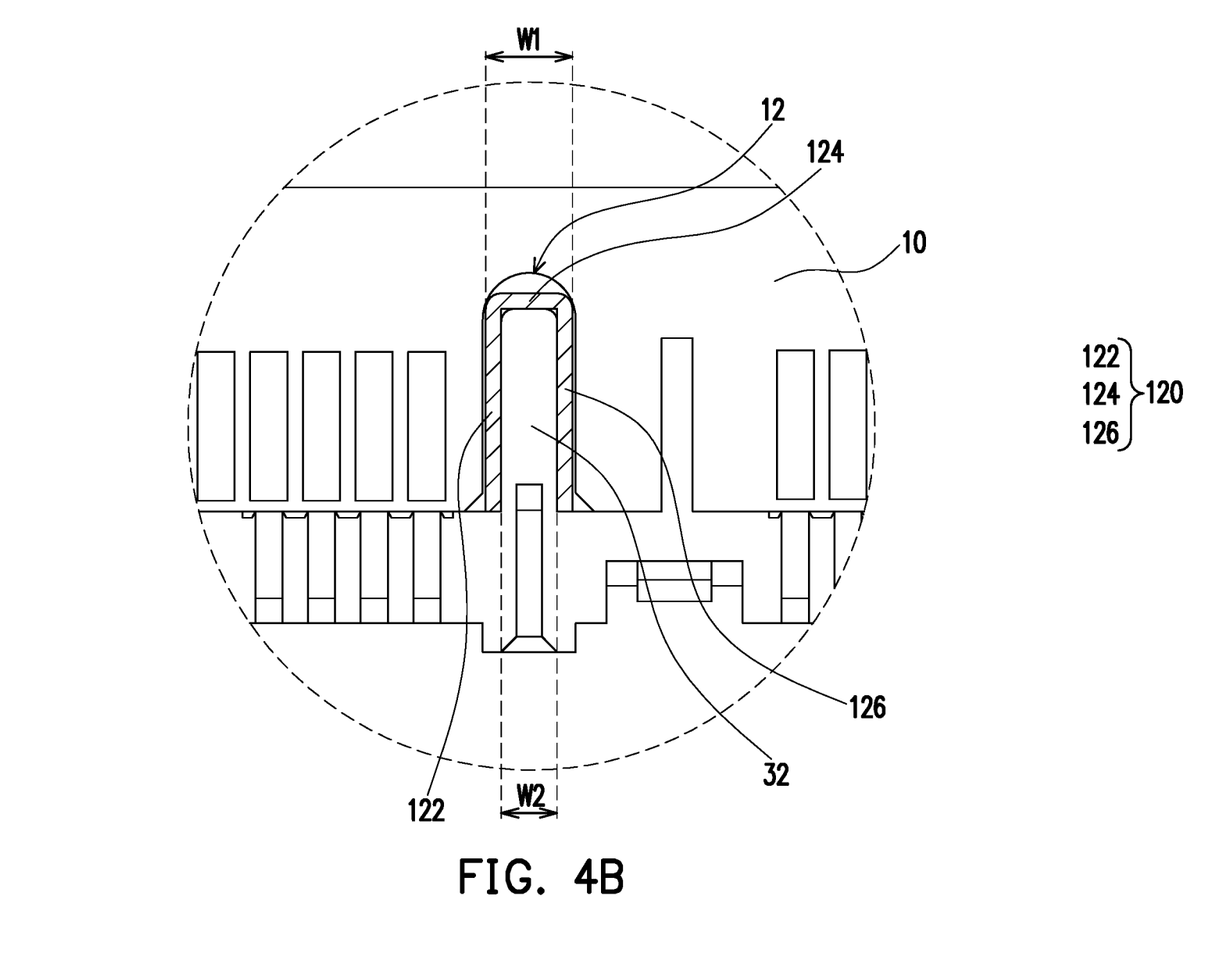
FIG. 4B is a schematic partially enlarged diagram of FIG. 4A.

FIG. 3 is a schematic cross-sectional diagram of the memory socket assembly depicted in FIG. 1. FIG. 4A is a schematic cross-sectional diagram of the memory module inserted in to the memory socket assembly depicted in FIG. 1. FIG. 4B is a schematic partially enlarged diagram of FIG. 4A.

Referring to FIG. 3 through FIG. 4B, in the present embodiment, the wear-resistant member 120 is connected to the two lateral walls 110 and disposed on the fool-proof member 32. The wear-resistant member 120 includes a first portion 122, a second portion 124 and a third portion 126 which are sequentially connected together. The second portion 124 is connected to the two lateral walls 110 and located on a top surface of the fool-proof member 32, and the first portion 122 and the third portion 126 are respectively located at two sides of the fool-proof member 32. In the present embodiment, lengths of the first portion 122 and the third portion 126 are approximately equal to each other, and the first portion 122, the second portion 124 and the third portion 126 present a U-shaped column, but the type of the wear-resistant member 120 is not limited thereto.

Moreover, referring to FIG. 2 and FIG. 3, in the present embodiment, the memory socket 30 has two positioning grooves 34 located at the two sides of the fool-proof member 32. An extension direction of the two positioning grooves 34 is perpendicular to an extension direction of the memory slots 31 and 33. The two positioning grooves 34 communicate with the memory slots 31 and 33. The first portion 122 and the third portion 126 of the wear-resistant member 120 are inserted into the two positioning grooves 34 of the memory socket 30 to be positioned. When the memory module 10 is inserted in or pulled from the memory socket 30, the first portion 122 and the third portion 126 may also be prevented from being opened outwards by the two positioning grooves 34, thereby preventing the wear-resistant member 120 from being deformed or being separated from the fool-proof member 32.

As illustrated in FIG. 4B, in the present embodiment, a width W1 of the wear-resistant member 120 is greater than or equal to a width W2 of the fool-proof member 32. Thus, the wear-resistant member 120 covered on the fool-proof member 32 may serve as a wear-resistant structure for protecting the fool-proof member 32. Moreover, since the width W1 of the wear-resistant member 120 is smaller than the width of the fool-proof concave 12, the wear-resistant member 120 does not block the memory module 10 from being inserted into the memory socket assembly 20. In this way, when the memory module 10 is inserted in or pulled from the memory socket 30, a wall of the memory module 10 besides the fool-proof concave 12 contacts the wear-resistant member 120, thereby preventing the fool-proof member 32 from being worn.

It is to be mentioned that in this embodiment, the memory socket protecting cover 100 may be manufactured by punching or bending a metal plate or by other manufacturing processes. That is to say, a thickness of the wear-resistant member 120 is the same as a thickness of each of the lateral walls 110, but the form of the wear-resistant member 120 is not limited thereto.

Figure 5:
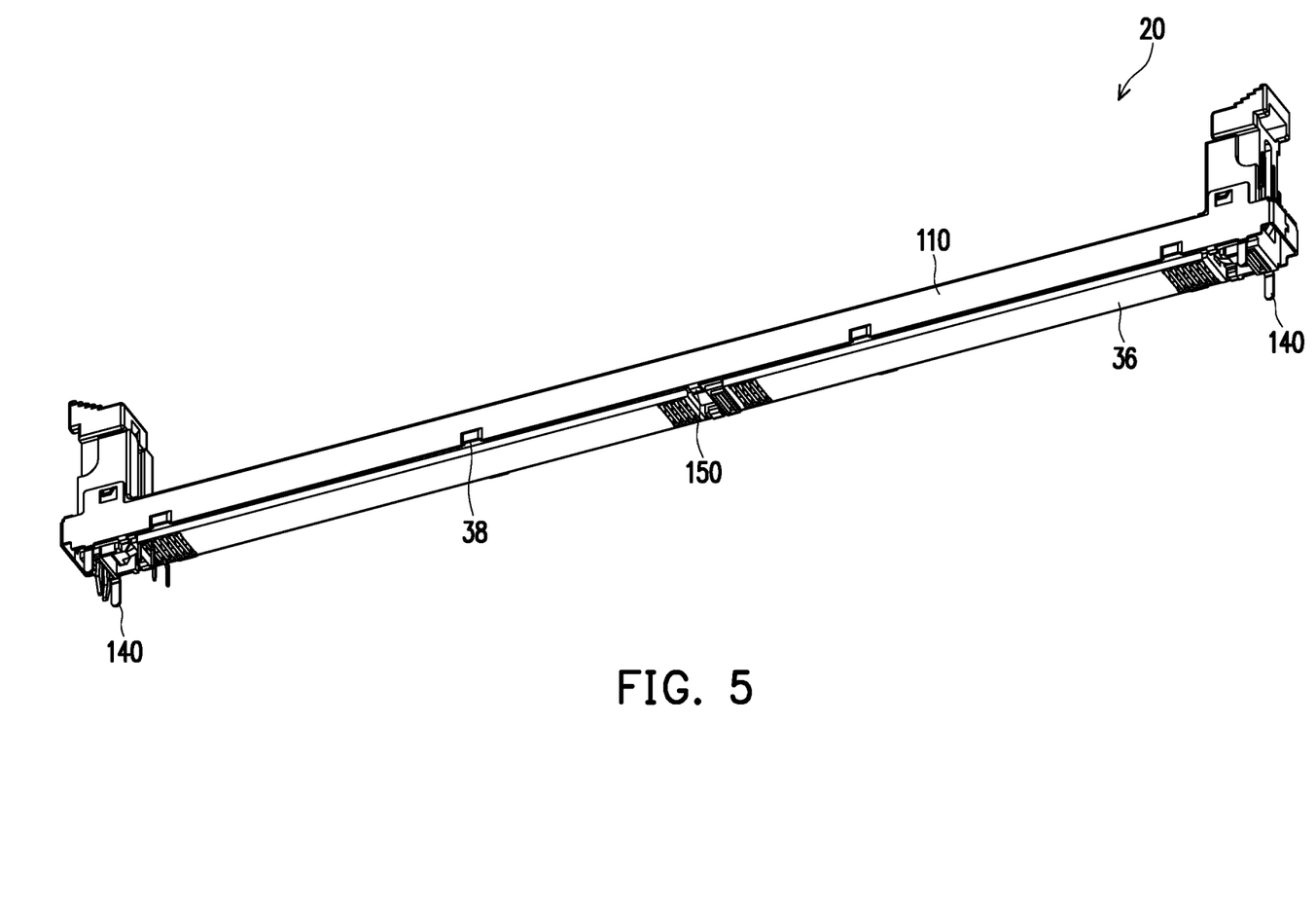
FIG. 5 is a schematic diagram of the memory socket assembly depicted in FIG. 1 in another view angle.

FIG. 5 is a schematic diagram of the memory socket assembly depicted in FIG. 1 in another view angle. Referring to FIG. 5, in the present embodiment, the memory socket protecting cover 100 further includes at least one fixing pin 140, at least one engagement portion 150 and at least one protrusive structure 112. In the present embodiment, the numbers of the at least one fixing pin 140, the at least one engagement portion 150 and the at least one protrusive structure 112 may be plural respectively. These fixing pins 140 extend downward from the two lateral walls 110, so as to be inserted to a mainboard (not shown) and stably fixed to the mainboard. The engagement portions 150 are bent from the bottoms of the two lateral walls 110 toward a bottom portion 36 of the memory socket 30 to increase the strength that the memory socket protecting cover 100 is fixed to the memory socket 30. The protrusive structures 112 are located on the two lateral walls 110 and used to improve structure strength of the lateral walls 110.

Figure 6:
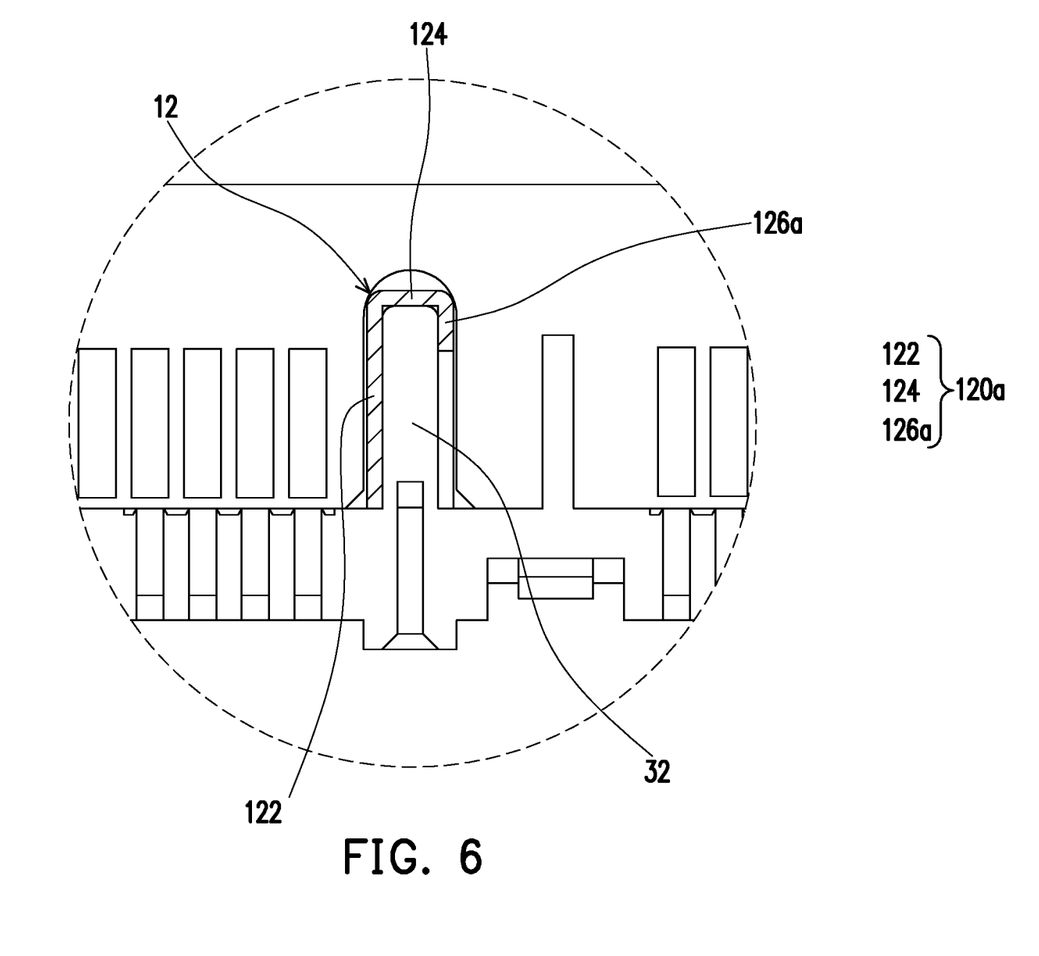
FIG. 6 through FIG. 8 are schematic partially cross-sectional diagrams illustrating various scenarios that the memory module is inserted into the memory socket assembly according to other embodiments of the invention.
Figure 7:
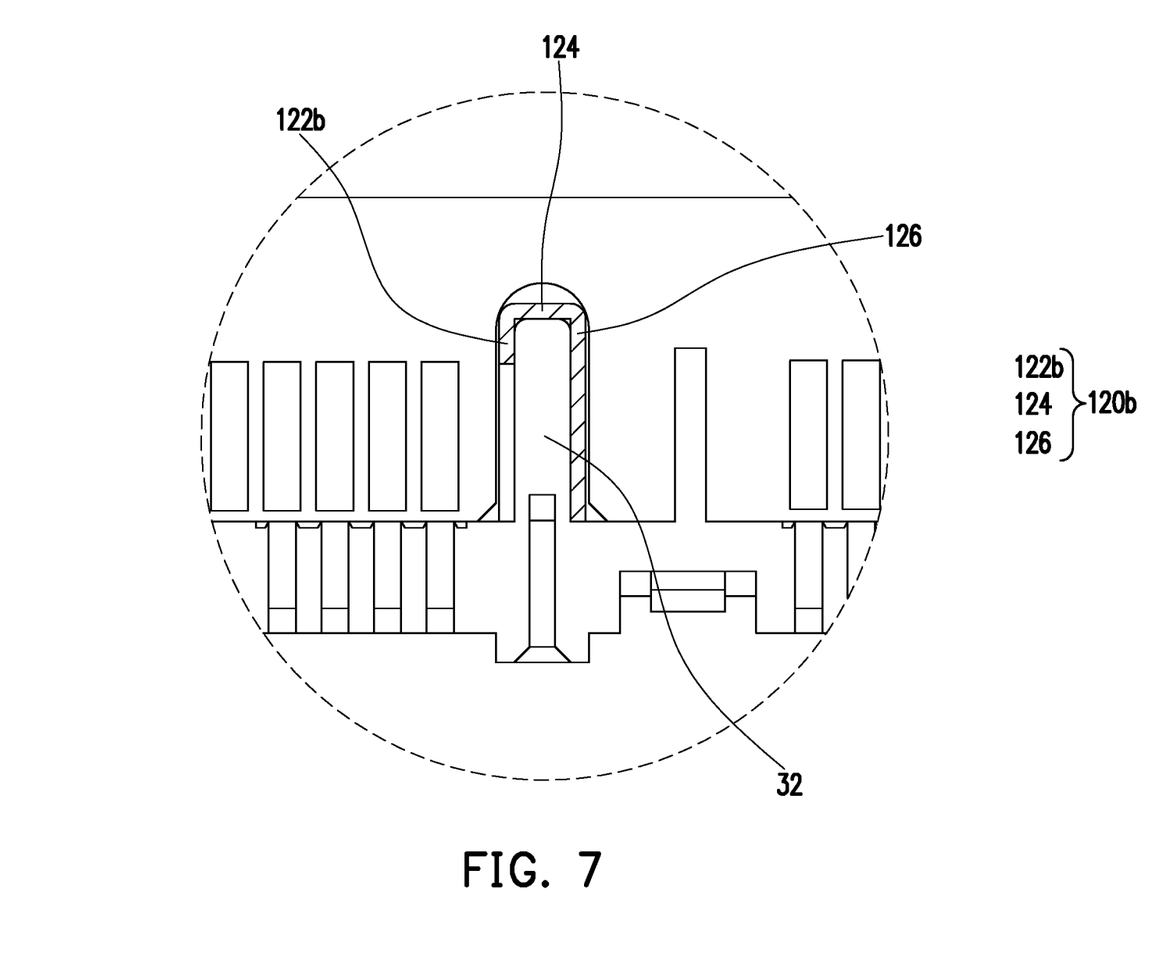
Figure 8:
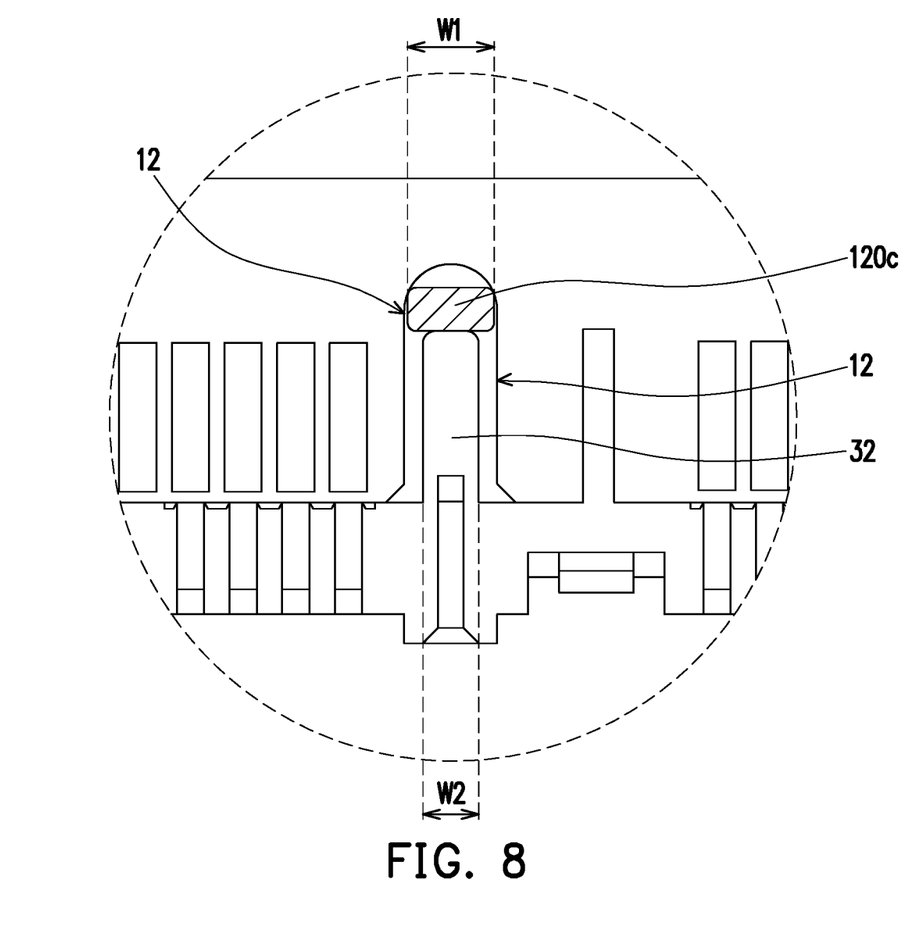

FIG. 6 through FIG. 8 are schematic partially cross-sectional diagrams illustrating various scenarios that the memory module is inserted into the memory socket assembly according to other embodiments of the invention. Referring to FIG. 6 first, the main difference between a wear-resistant member 120a illustrated in FIG. 6 and the wear-resistant member 120 illustrated in FIG. 4B lies in the following. In FIG. 4B, the lengths of the first portion 122 and the third portion 126 of the wear-resistant member 120 are approximately equal to each other, such that the first portion 122, the second portion 124 and the third portion 126 present the U-shaped column. In FIG. 6, lengths of a first portion 122 and a third portion 126a of the wear-resistant member 120a are not equal to each other. The length of the third portion 126a is smaller than the length of the first portion 122, such that the first portion 122, a second portion 124 and the third portion 126a present a J-shaped column.

According to FIG. 6, even the lengths of the first portion 122 and the third portion 126a of the wear-resistant member 120a are not equal to each other, in FIG. 6, a part of the right side of the fool-proof member 32 near the top surface is still covered by the third portion 126a. Thus, the third portion 126a of the wear-resistant member 120a may still be capable of protecting the fool-proof member 32, and when being inserted in or pulled from the memory socket 30, the memory module 10 may contact the wall of the memory module 10 besides the fool-proof concave 12 in replacement with the fool-proof member 32.

Referring to FIG. 7, a length of a third portion 126 of a wear-resistant member 120b illustrated in FIG. 7 is greater than a length of a first portion 122b. Even though the length of the first portion 122b illustrated in FIG. 7 is smaller, in the same way, a part of the left side of the fool-proof member 32 near the top surface is still covered by the first portion 126b. Thus, the first portion 126b of the wear-resistant member 120 may still be capable of protecting the fool-proof member 32, and when being inserted in or pulled from the memory socket 30, the memory module 10 may contact the wall of the memory module 10 besides the fool-proof concave 12 in replacement with the fool-proof member 32.

Referring to FIG. 8, in the present embodiment, a wear-resistant member 120c presents an I-shaped column. The wear-resistant member 120c is located on the top surface of the fool-proof member 32. Namely, in the present embodiment, the wear-resistant member 120c does not extend to the two sides of the fool-proof member 32. However, since the wear-resistant member 120c is located on the top surface of the fool-proof member 32 and has the width W1 greater than or equal to the width W2 of the fool-proof member 32, when the memory module 10 is inserted in or pulled from the memory socket 30, the wall of the memory module 10 besides the fool-proof concave 12 still first contacts two sides of the wear-resistant member 120c, such that a probability that the fool-proof member 32 is worn by the wall of the memory module 10 besides the fool-proof concave 12 may be reduced.

It is to be mentioned that in this embodiment, the wear-resistant member 120c has a specific thickness to provide the left and the right sides thereof to be contacted or worn by the wall of the memory module 10 besides the fool-proof concave 12. Thus, the thickness of the wear-resistant member 120c may be greater than a thickness of any other portion (e.g., the side wall 110) of the memory socket protecting cover 100. A manufacturer, for example, may fix the wear-resistant member 120c having the greater thickness to the two side walls 110 by means of soldering or adhering. Alternatively, the manufacturer may perform the manufacturing first by using a plate body having the same thickness through punching or bending the plate body and then increase the thickness of a portion where the wear-resistant member 120c is located by electroplating or sputtering the portion. Certainly, the manufacturing and structure of the wear-resistant member 120c are not limited thereto.

Based on the above, the wear-resistant member of the memory socket protecting cover of the invention is adapted to be disposed on the fool-proof member of the memory socket, and the width of the wear-resistant member is greater than or equal to the width of the fool-proof member, such that when the memory module is inserted in or pulled from the memory socket, the wall of the memory module besides the fool-proof concave contacts the wear-resistant member, thereby reducing a probability that a fool-proof member of a memory socket is worn, as well as reducing the issues between the goldfingers on the memory module and the pads inside the memory slot, such as poor contact, offset misalignment or short circuit.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A memory socket protecting cover, adapted to be assembled to a memory socket, wherein the memory socket is adapted for a memory module to insert, the memory module comprises a fool-proof concave, and the memory socket comprises a fool-proof member corresponding to the fool-proof concave, the memory socket protecting cover comprising:
  two lateral walls, adapted to be disposed at whole of two long side surfaces of the memory socket; and
  a wear-resistant member, connected to the two lateral walls and adapted to be disposed on the fool-proof member, wherein a width of the wear-resistant member is greater than or equal to a width of the fool-proof member, and is smaller than a width of the fool-proof concave,
  wherein when the memory module is inserted in or pulled from the memory socket, a wall of the memory module beside the fool-proof concave is adapted to contact the wear-resistant member.

2. The memory socket protecting cover according to claim 1, wherein the wear-resistant member comprises a first portion, a second portion and a third portion which are sequentially connected together, the second portion is connected to the two lateral walls and adapted to be located on a top surface of the fool-proof member, and the first portion and the third portion are adapted to be respectively located at two sides of the fool-proof member.

3. The memory socket protecting cover according to claim 2, wherein the first portion, the second portion and the third portion present a U-shaped column.

4. The memory socket protecting cover according to claim 2, wherein the first portion, the second portion and the third portion present a J-shaped column.

5. The memory socket protecting cover according to claim 1, wherein the wear-resistant member presents an I-shaped column, the wear-resistant member is adapted to be located on a top surface of the fool-proof member, and a thickness of the wear-resistant member is greater than a thickness of each of the lateral walls.

6. A memory socket assembly, adapted for a memory module to insert, wherein the memory module comprises a fool-proof concave, the memory socket assembly comprising:
  a memory socket, comprising a fool-proof member corresponding to the fool-proof concave;
  a memory socket protecting cover, assembled to the memory socket, comprising:
    two lateral walls, disposed at whole of two long side surfaces of the memory socket; and
    a wear-resistant member, connected to the two lateral walls and disposed on the fool-proof member, wherein a width of the wear-resistant member is greater than or equal to a width of the fool-proof member and is smaller than a width of the fool-proof concave,
  wherein when the memory module is inserted in or pulled from the memory socket, a wall of the memory module beside the fool-proof concave is adapted to contact the wear-resistant member, and a length of the memory socket protecting cover is not less than a length of the memory socket.

7. The memory socket assembly according to claim 6, wherein the wear-resistant member comprises a first portion, a second portion and a third portion which are sequentially connected together, the second portion is connected to the two lateral walls and located on a top surface of the fool-proof member, and the first portion and the third portion are respectively located at two sides of the fool-proof member.

8. The memory socket assembly according to claim 7, wherein the first portion, the second portion and the third portion present a U-shaped column.

9. The memory socket assembly according to claim 7, wherein the first portion, the second portion and the third portion present a J-shaped column.

10. The memory socket assembly according to claim 7, wherein the memory socket has a memory slot and two positioning grooves located at the two sides of the fool-proof member, an extension direction of the two positioning grooves is perpendicular to an extension direction of the memory slot, the two positioning grooves communicate with the memory slot, and the first portion and the third portion are inserted into the two positioning grooves to be positioned.

11. The memory socket assembly according to claim 6, wherein the wear-resistant member presents an I-shaped column, the wear-resistant member is located on a top surface of the fool-proof member, and a thickness of the wear-resistant member is greater than a thickness of each of the lateral walls.

* * * * *